United States Patent
Chae et al.

(10) Patent No.: US 10,660,052 B2
(45) Date of Patent: May 19, 2020

(54) METHOD AND APPARATUS FOR SIGNAL TRANSMISSION AND RECEPTION ON UNLICENSED BAND IN WIRELESS COMMUNICATION SYSTEM

(71) Applicant: LG ELECTRONICS INC., Seoul (KR)

(72) Inventors: Hyukjin Chae, Seoul (KR); Joonkui Ahn, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/509,015

(22) PCT Filed: Sep. 7, 2015

(86) PCT No.: PCT/KR2015/009409
§ 371 (c)(1),
(2) Date: Mar. 6, 2017

(87) PCT Pub. No.: WO2016/036219
PCT Pub. Date: Mar. 10, 2016

(65) Prior Publication Data
US 2017/0289936 A1    Oct. 5, 2017

Related U.S. Application Data

(60) Provisional application No. 62/046,180, filed on Sep. 5, 2014.

(51) Int. Cl.
*H04W 56/00* (2009.01)
*H04L 27/26* (2006.01)
(Continued)

(52) U.S. Cl.
CPC ......... *H04W 56/001* (2013.01); *H04L 5/0048* (2013.01); *H04L 25/03866* (2013.01);
(Continued)

(58) Field of Classification Search
CPC .................................................. H04W 56/001
See application file for complete search history.

(56) References Cited

U.S. PATENT DOCUMENTS

2009/0268910 A1* 10/2009 Liu ...................... H04J 11/0079
380/268
2011/0312339 A1* 12/2011 Kuningas .............. G01S 5/0226
455/456.1

(Continued)

FOREIGN PATENT DOCUMENTS

WO    WO 2014/022860 A1    2/2014

*Primary Examiner* — Kevin M Cunningham
(74) *Attorney, Agent, or Firm* — Birch, Stewart, Kolasch & Birch, LLP

(57) ABSTRACT

A method for signal transmission and reception on an unlicensed band by a terminal in a wireless communication system, according to an embodiment of the present invention, comprises the steps of: receiving a reference signal that has been generated from a scrambling sequence having initial values that vary every 10 subframes; and receiving a downlink signal on the basis of the reference signal, wherein the seed value of the variation pattern of the initial values are determined on the basis of an operator of a base station that transmits the downlink signal on the unlicensed band.

14 Claims, 8 Drawing Sheets

(51) Int. Cl.
  *H04L 25/03* (2006.01)
  *H04L 5/00* (2006.01)
  *H04W 72/04* (2009.01)
  *H04W 88/02* (2009.01)
  *H04W 88/08* (2009.01)

(52) U.S. Cl.
  CPC .......... *H04L 27/26* (2013.01); *H04L 27/2613* (2013.01); *H04W 72/042* (2013.01); *H04W 72/0446* (2013.01); *H04L 5/001* (2013.01); *H04L 5/0051* (2013.01); *H04L 5/0096* (2013.01); *H04W 88/02* (2013.01); *H04W 88/08* (2013.01)

(56) References Cited

U.S. PATENT DOCUMENTS

| | | | |
|---|---|---|---|
| 2013/0114570 A1* | 5/2013 | Park | H04L 5/0053 370/335 |
| 2013/0250913 A1 | 9/2013 | Geirhofer et al. | |
| 2013/0308655 A1 | 11/2013 | Ho | |
| 2013/0315152 A1 | 11/2013 | Ratasuk et al. | |
| 2014/0018086 A1 | 1/2014 | Guo et al. | |
| 2015/0098349 A1* | 4/2015 | Wei | H04W 16/14 370/252 |
| 2016/0309509 A1* | 10/2016 | Yan | H04W 16/02 |
| 2017/0150462 A1* | 5/2017 | Zeng | H04W 24/00 |

* cited by examiner

METHOD AND APPARATUS FOR SIGNAL TRANSMISSION AND RECEPTION ON UNLICENSED BAND IN WIRELESS COMMUNICATION SYSTEM

CROSS REFERENCE TO RELATED APPLICATIONS

This application is the National Phase of PCT International Application No. PCT/KR2015/009409, filed on Sep. 7, 2015, which claims priority under 35 U.S.C. 119(e) to U.S. Provisional Application No. 62/046,180, filed on Sep. 5, 2014, all of which are hereby expressly incorporated by reference into the present application.

TECHNICAL FIELD

The present invention relates to a wireless communication system, and more particularly, to a method and apparatus for transmitting and receiving signals on an unlicensed band.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE OF THE INVENTION

Technical Task

The technical task of the present invention is to provide a solution for a case that operators use the same cell ID on an unlicensed band.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of receiving a signal on an unlicensed band in a user equipment of a wireless communication system, including receiving a reference signal generated from a scrambling sequence having an initial value changed in every 10 subframes and receiving a downlink signal based on the reference signal, wherein a seed value of a change pattern the initial value is determined according to an operator of a base station transmitting the downlink signal on the unlicensed band.

In another technical aspect of the present invention, provided herein is a user equipment in receiving a signal on an unlicensed bad in a wireless communication system, including a transmitting device, a receiving device, and a processor configured to receive a reference signal generated from a scrambling sequence having an initial value changed in every 10 subframes and receive a downlink signal based on the reference signal, wherein a seed value of a change pattern the initial value is determined according to an operator of a base station transmitting the downlink signal on the unlicensed band.

The initial value of the scrambling sequence may be changed although the user equipment does not perform a handover.

A synchronization signal transmitted on the unlicensed band may be changed in the every 10 subframes.

The every 10 subframes may correspond to a subframe of a primary cell.

The seed value of the change pattern may be received through physical layer signaling of a primary cell or higher layer signaling.

The reference signal may include a downlink reference signal except an EPDCCH (enhanced physical downlink control channel) related to DMRS (demodulation reference signal) and an MBSFN (multicast broadcast single frequency network) reference signal.

A cell ID of the base station may be changed according to the change pattern in the every 10 subframes.

Advantageous Effects

According to an embodiment of the present invention, an operation for a user equipment to receive a signal of another operator's cell instead of its own cell can be prevented.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
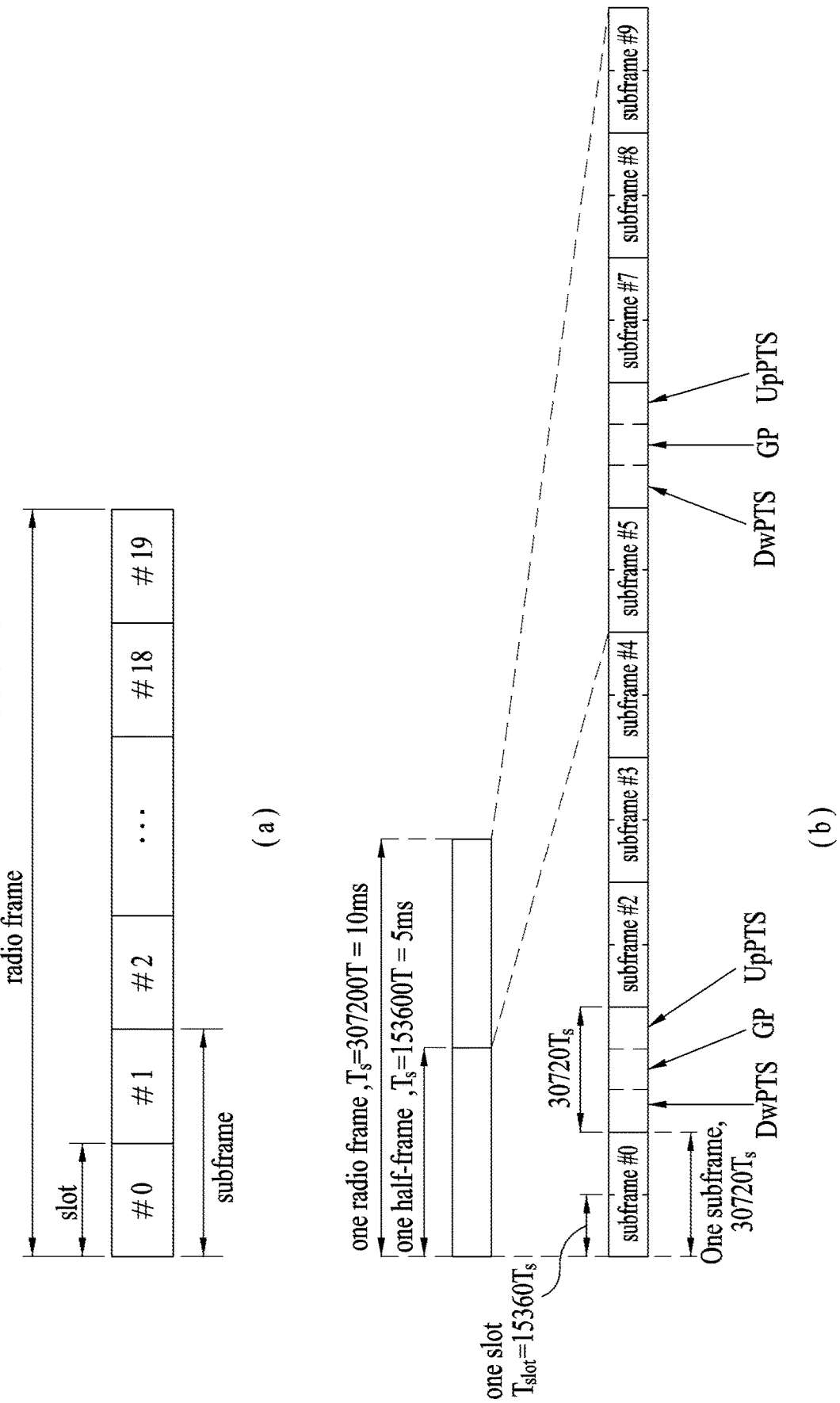
FIG. 1 is a diagram to illustrate a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. Moreover, in the following description, 'base station' may be used to mean a device such as a scheduling performing node, a cluster header or the like. If a base station or a relay sends a signal, which may be sent by a terminal, it can be regarded as a sort of a terminal.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
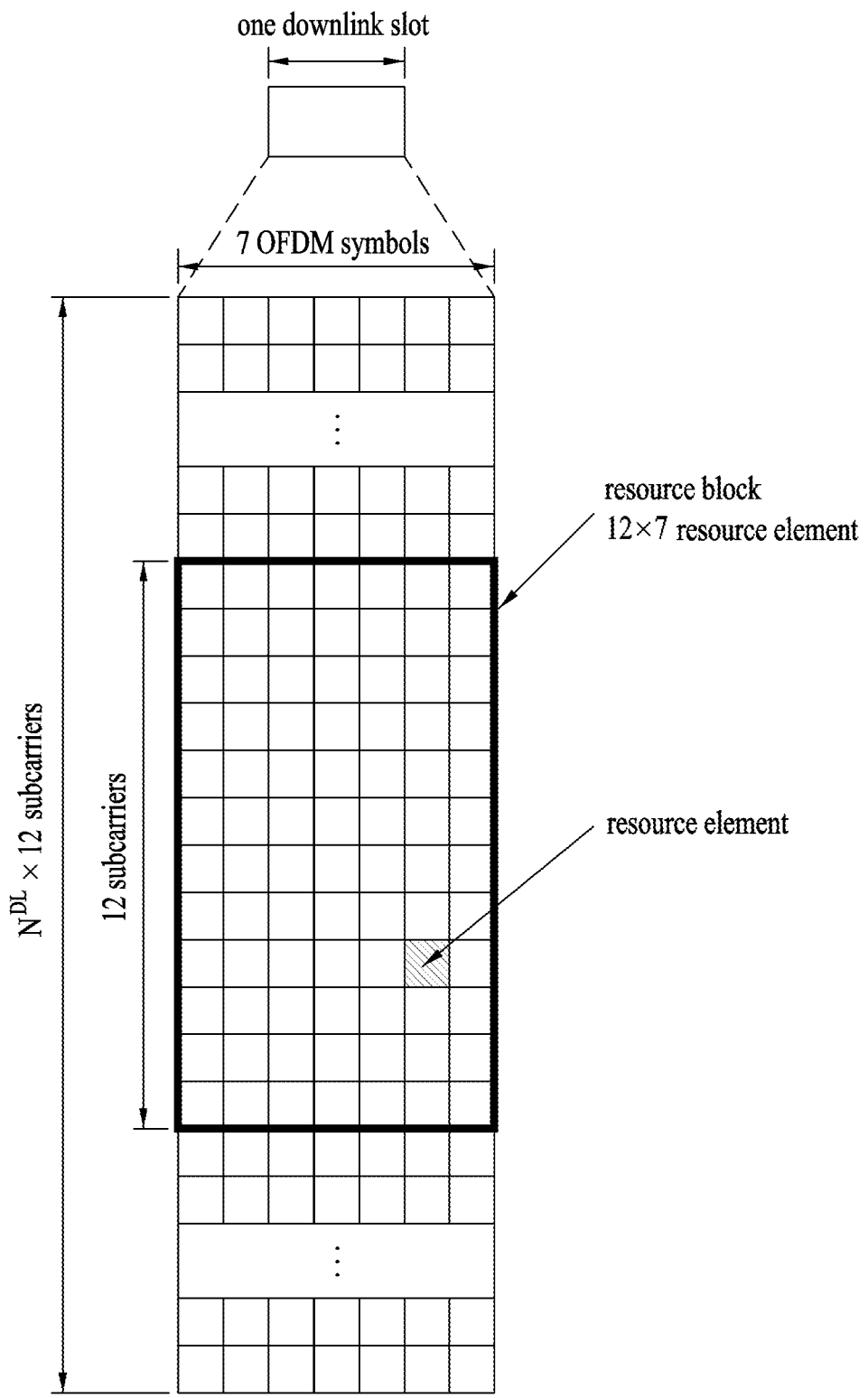
FIG. 2 is a diagram to illustrate a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
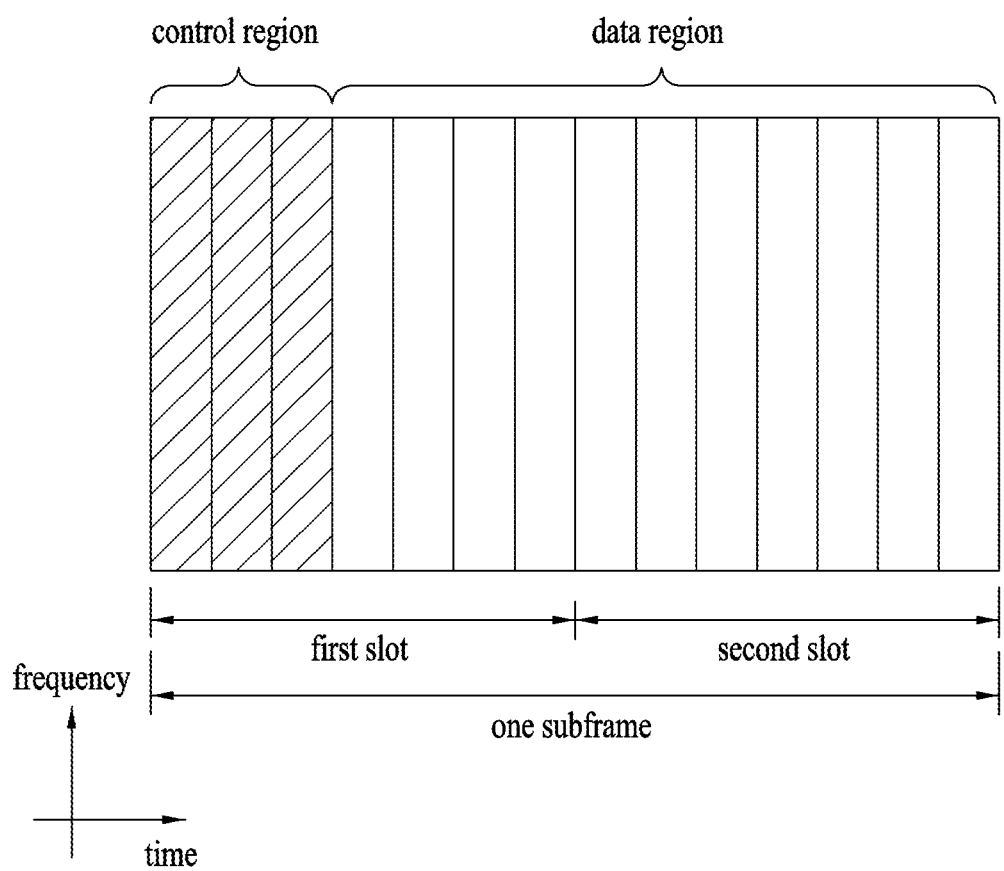
FIG. 3 is a diagram to illustrate a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE correspond to a plurality of RE (resource element) groups. The number of CCE required for PDCCH may vary according to a size of DCI, a coding rate and the like. For instance, one of the CCE numbers '1', '2', '4' and '8', which correspond to PDCCH format 0, PDCCH format 1, PDCCH format 2 and PDCCH format 3, respectively, is usable for PDCCH transmission. If a size of DCI is large and/or a low coding rate is necessary due to a poor channel state, the relatively large number of CCEs may be used for a single PDCCH transmission. An eNB determines the PDCCH format according to a size of DCI transmitted to a UE, a cell bandwidth, the number of DL antenna ports, a PHICH resource amount and the like, and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked with a cell-RNTI (C-RNTI) of the UE. If the PDCCH relates to a paging message, the CRC may be masked with a Paging Indicator Identifier (P-RNTI). If the PDCCH relates to system information (particularly, a System Information Block (SIB)), its CRC may be masked with a system information ID and a System Information RNTI (SI-RNTI). To indicate that the PDCCH carries a Random Access Response in response to a Random Access Preamble transmitted by a UE, its CRC may be masked with a Random Access-RNTI (RA-RNTI).

Figure 4:
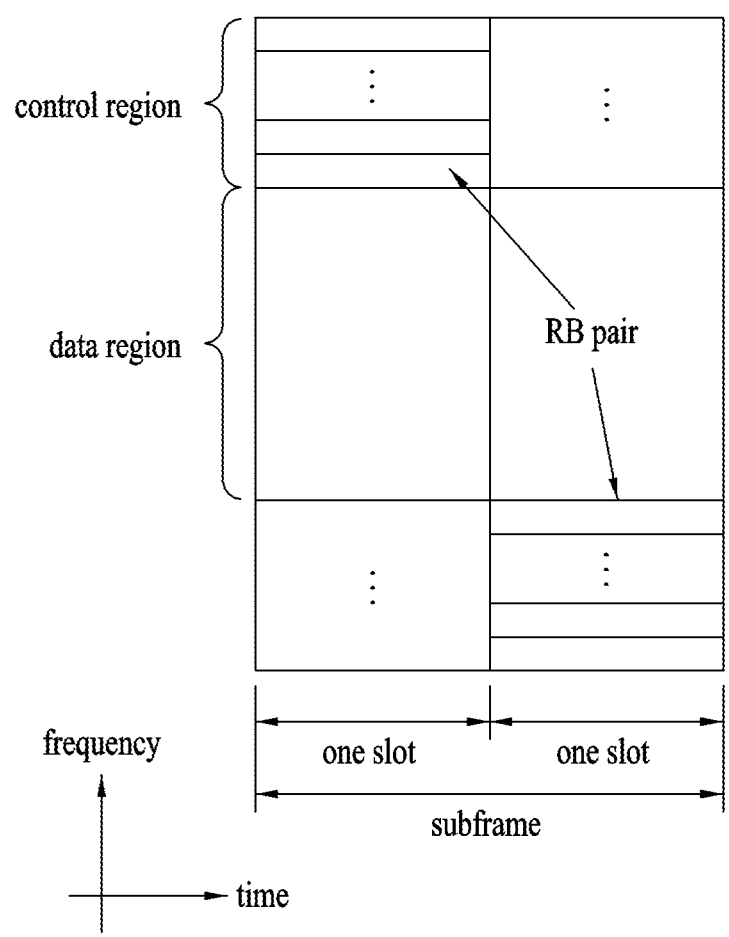
FIG. 4 is a diagram to illustrate a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

DCI Format

According to the current LTE-A (release 10), DCI formats 0, 1, 1A, 1B, 1C, 1D, 2, 2A, 2B, 2C, 3, 3A and 4 are defined. In this case, the DCI formats 0, 1A, 3 and 3A are defined to have the same message size as one another to reduce the number of blind decoding times, wherein blind decoding will be described later. These DCI formats may be divided into i) DCI formats 0 and 4 used for uplink grant, ii) DCI formats 1, 1A, IB, 1C, 1D, 2, 2A, 2B and 2C used for downlink scheduling allocation, and iii) DCI formats 3 and 3A used for power control command depending on usage of control information to be transmitted.

The DCI format 0 used for uplink grant may include carrier offset (carrier indicator) required in respect of carrier aggregation, which will be described later, offset (flag for format 0/format 1A differentiation) used to identify the DCI format 0 from the DCI format 1A, a frequency hopping flag notifying whether frequency hopping is used for uplink PUSCH transmission, information on resource block assignment to be used for PUSCH transmission by the user equipment, a modulation and coding scheme, a new data indicator used to empty a buffer to perform initial transmission in respect of HARQ process, a transmission power control (TPC) command for scheduled for PUSCH, cyclic shift for demodulation reference signal (DMRS) and OCC index, uplink (UL) index required for TDD operation, and request of channel quality information (CQI). Meanwhile, since synchronous HARQ is used for the DCI format 0, the DCI format 0 does not include redundancy version unlike the DCI formats related to downlink scheduling allocation. The carrier indicator is not included in the DCI format if cross carrier scheduling is not used.

The DCI format 4 is newly added in the LTE-A release 10, and is to support application of spatial multiplexing to uplink transmission in the LTE-A. Since the DCI format 4 further includes information for spatial multiplexing as compared with the DCI format 0, the DCI format 4 has a greater message size, and further includes additional control information in addition to the control information included in the DCI format 0. In other words, the DCI format 4 further includes a modulation and coding scheme for a second transport block, precoding information for multi-antenna transmission, and sounding reference signal (SRS) request information. Meanwhile, since the DCI format 4 has a size greater than that of the DCI format 0, the DCI format 4 does not include offset for identifying the DCI format 0 from the DCI format 1A.

The DCI formats 1, 1A, 1B, 1C, 1D, 2, 2A, 2B and 2C used for downlink scheduling allocation may be divided into the DCI formats 1, 1A, 1B, 1C and 1D, which do not support spatial multiplexing, and the DCI formats 2, 2A, 2B and 2C, which support spatial multiplexing.

The DCI format 1C supports frequency continuous allocation only as compact downlink allocation, and does not include carrier offset and redundancy version as compared with the other formats.

The DCI format 1A is the format for downlink scheduling and random access process. The DCI format 1A may include carrier offset, an indicator indicating whether downlink distributive transmission is used, PDSCH resource allocation information, a modulation and coding scheme, redundancy version, HARQ process number for indicating a processor used for soft combining, new data offset used to empty a buffer for initial transmission in respect of HARQ process, a transmission power control command for PUCCH, and an uplink index required for TDD operation.

Control information of the DCI format 1 is mostly similar to that of the DCI format 1A. However, the DCI format 1A is related to continuous resource allocation, whereas the DCI format 1 supports discontinuous resource allocation. Accordingly, since the DCI format 1 further includes a resource allocation header, control signaling overhead is increased as trade-off of increase of flexibility in resource allocation.

As compared with the DCI format 1, the DCI formats 1B and 1D are common for each other in that the DCI formats 1B and 1D further include precoding information. The DCI format 1B includes PMI confirmation information, and the DCI format 1D includes downlink power offset information. The other control information included in the DCI formats 1B and 1D mostly corresponds to that of the DCI format 1A.

The DCI formats 2, 2A, 2B and 2C basically include most of the control information included in the DCI format 1A, and further includes information for spatial multiplexing. In this case, the information for spatial multiplexing include a modulation and coding scheme related to the second transport block, new data offset, and redundancy version.

The DCI format 2 supports closed-loop spatial multiplexing, the DCI format 2A supports open-loop spatial multiplexing. Both the DCI formats 2 and 2A include precoding information. The DCI format 2B supports dual layer spatial multiplexing combined with beamforming, and further includes cyclic shift information for DMRS. The DCI format 2C may be understood as extension of the DCI format 2B, and supports spatial multiplexing to reach eight layers.

The DCI formats 3 and 3A may be used to complement transmission power control information included in the aforementioned DCI formats for uplink grant and downlink scheduling allocation, that is, support semi-persistent scheduling. A command of 1 bit per user equipment is used in case of the DCI format 3, and a command of 2 bits per user equipment is used in case of the DCI format 3A.

Any one of the aforementioned DCI formats is transmitted through one PDCCH, and a plurality of PDCCHs may be transmitted within the control region. The user equipment may monitor the plurality of PDCCHs.

PDCCH Processing

A control channel element (CCE) which is a logic allocation unit is used when the PDCCH is mapped into REs. One CCE includes a plurality of resource element groups (REGs) (for example, nine REGs), each of which includes four neighboring REs excluding a reference signal (RS).

The number of CCEs required for a specific PDCCH is varied depending on DCI payload which is a size of control information, a cell bandwidth, a channel coding rate, etc. In more detail, the number of CCEs for a specific PDCCH may be defined in accordance with a PDCCH format as illustrated in Table 1 below.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Any one of four formats may be used for the PDCCH as described above, and is not notified to the user equipment. Accordingly, the user equipment should perform decoding without knowing the PDCCH format. In this case, decoding will be referred to as blind decoding. However, if the user equipment performs decoding of all the CCEs used for the downlink for each PDCCH format, it may cause great load. Accordingly, a search space is defined considering restriction of a scheduler and the number of decoding try times.

In other words, the search space is a set of candidate PDCCHs comprised of CCEs that should be decoded by the user equipment on an aggregation level. In this case, the aggregation level and the number of PDCCH candidates may be defined as illustrated in Table 2 below.

TABLE 2

| | Search space | | |
|---|---|---|---|
| | Aggregation level | Size (CCE unit) | The number of PDCCH candidates |
| User equipment-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As will be aware of it from Table 2 above, since four aggregation levels exist, the user equipment has a plurality of search spaces in accordance with each aggregation level. Also, as illustrated in Table 2, the search space may be divided into a user equipment specific search space and a common search space. The user equipment specific search space is intended for specific user equipments, each of which may acquire control information if RNTI and CRC masked in the PDCCH are valid by monitoring (trying decoding for a set of the PDCCH candidates in accordance with an available DCI format) the user equipment specific search space and checking the RNTI and the CRC.

The common search space is intended for dynamic scheduling for system information or paging message, and is used if a plurality of user equipments or all the user equipments should receive the PDCCH. However, the common search space may be used for a specific user equipment in view of resource management. Also, the common search space may be overlapped with the user equipment specific search space.

The search space may be determined specifically by the following Equation 1.

$$L\{(Y_k+m')\mod\lfloor N_{CCE,k}/L\rfloor\}+i \quad \text{Equation 1}$$

In this case, L is an aggregation level, $Y_k$ is a factor determined by RNTI and subframe number k, m' is the number of PDCCH candidates, is equal to $m+M^{(L)} \cdot n_{C1}$ if carrier aggregation is used and is equal to m (m'=m (m=0, ..., $M^{(L)}-1$)) if not so, $M^{(L)}$ is the number of PDCCH candidates, $N_{CCE,k}$ is a total number of CCEs of a control region at the kth subframe, and i is a factor that designates an individual CCE from each PDCCH candidate of the PDCCH (i=0, ..., L-1). In case of the common search space, $Y_k$ is always determined as 0.

Figure 5:
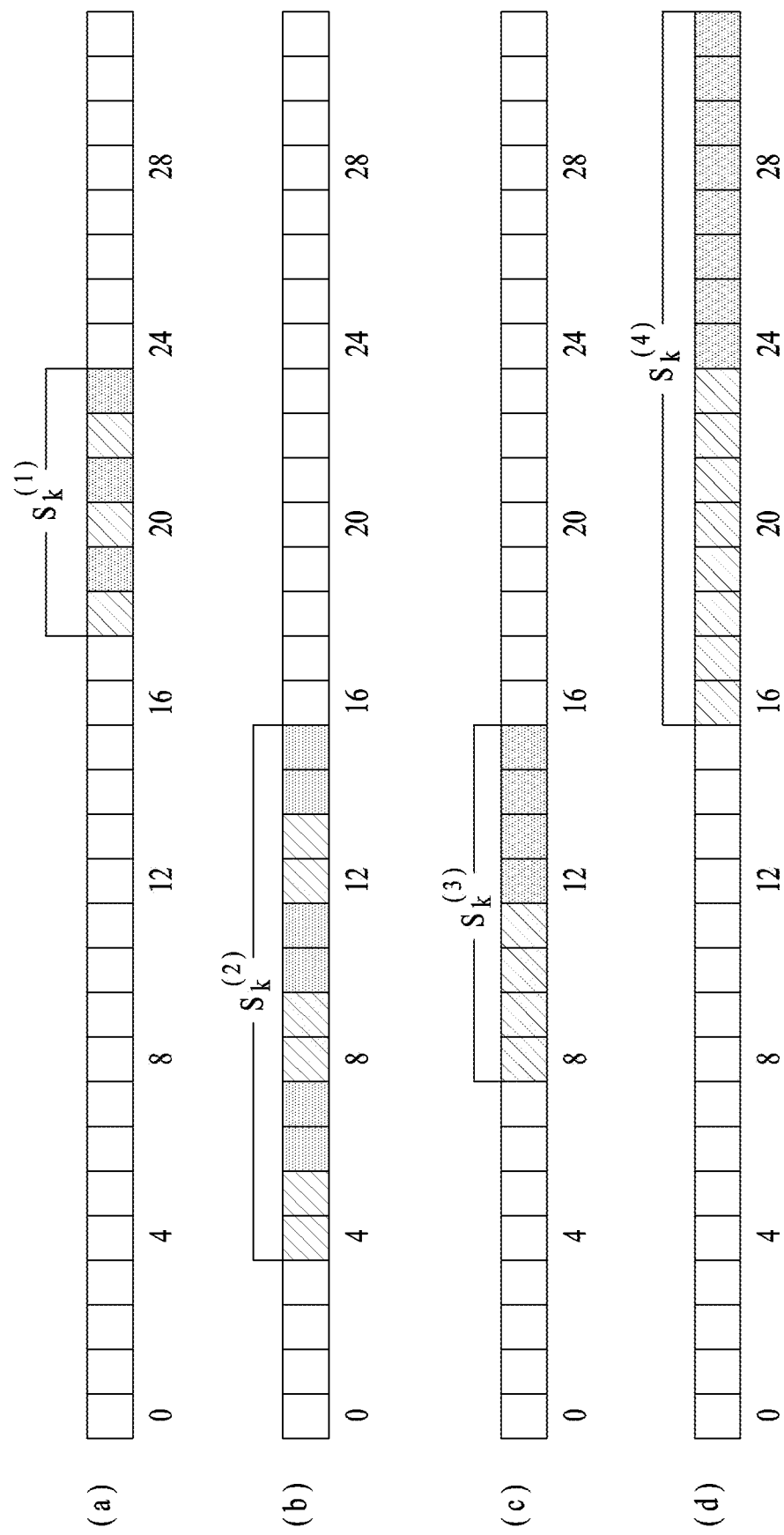
FIG. 5 is a diagram to describe a search space.

FIG. 5 illustrates a user equipment specific search space (shaded portion) at each aggregation level that may be defined in accordance with the above Equation 1. In this case, carrier aggregation is not used, and the number of $N_{CCE,k}$ is 32 for convenience of description.

FIGS. 5(a), 5(b), 5(c) and 5(d) respectively illustrate aggregation levels of 1, 2, 4 and 8, wherein numbers represent CCE numbers. In FIG. 5, a start CCE of the search space at each aggregation level is determined by RNTI and subframe number k as described above, and may be determined differently for each aggregation level due to a modulo function and L within the same subframe for one user equipment and is determined as a multiple only of the aggregation level due to L. In this case, $Y_k$ is exemplarily assumed as CCE number 18. The user equipment sequentially tries decoding for CCEs determined in accordance with the corresponding aggregation level by starting from the start CCE. For example, in (b) of FIG. 5, the user equipment tries decoding for the CCEs in a unit of two CCEs in accordance with the aggregation level by starting from the CCE number 4 which is the start CCE.

As described above, the user equipment tries decoding for the search space, wherein the number of decoding try times is determined by a transmission mode which is determined through the DCI format and RRC signaling. If carrier aggregation is not used, since the user equipment should consider two types of DCI sizes (DCI format 0/1A/3/3A and DCI format 1C) for each of six PDCCH candidates in case of the common search space, the number of decoding try times corresponding to maximum 12 times will be required. In case of the user equipment specific search space, since the user equipment considers two types of DCI sizes for the number of PDCCH candidates (6+6+2+2=16), the number of decoding try times corresponding to maximum 32 times will be required. Accordingly, if carrier aggregation is not used, the number of decoding try times corresponding to maximum 44 times will be required.

Meanwhile, if carrier aggregation is used, since decoding for the user equipment specific search space and the DCI format 4 is additionally performed as much as the number of downlink resources (component carriers), the maximum number of decoding times will be more increased.

Reference Signal (RS)

In the wireless communication system, since a packet is transmitted through a radio channel, signal distortion may occur during transmission of the packet. In order to normally receive the distorted signal in a receiving side, distortion of the received signal should be compensated using channel information. In order to discover the channel information, it is required to transmit the signal known by both a transmitting side and the receiving side and discover the channel information using a distortion level of the signal when the signal is transmitted through the channel. In this case, the signal known by both the transmitting side and the receiving side will be referred to as a pilot signal or a reference signal.

In case that multiple antennas are used to transmit and receive data, a channel status between each transmitting antenna and each receiving antenna should be known to receive a normal signal. Accordingly, a separate reference signal should exist per transmitting antenna, in more detail, per antenna port.

The reference signal may be divided into an uplink reference signal and a downlink reference signal. In the current LTE system, the uplink reference signal may include:

i) a demodulation reference signal (DM-RS) for channel estimation for coherent demodulation of information transmitted through the PUSCH and the PUCCH; and ii) a sounding reference signal (SRS) for allowing a base station to measure uplink channel quality at frequencies of different networks.

Meanwhile, the downlink reference signal may include:

i) a cell-specific reference signal (CRS) shared among all the user equipments within the cell;

ii) a user equipment (UE)-specific reference signal for a specific user equipment only;

iii) a demodulation reference signal (DM-RS) for coherent demodulation if the PDSCH is transmitted;

iv) channel state information-reference signal (CSI-RS) for transferring channel state information (CSI) if a downlink DMRS is transmitted;

v) a multimedia broadcast single frequency network (MBSFN) reference signal transmitted for coherent demodulation for a signal transmitted in an MBSFN mode; and vi) a positioning reference signal used to estimate geographic position information of the user equipment.

The reference signal may be divided into two types in accordance with its purpose. Namely, examples of the reference signal include a reference signal used for acquisition of channel information and a reference signal used for data demodulation. Since the former reference signal is intended for acquisition of channel information on the downlink through the user equipment, it needs to be transmitted through a wideband. Also, the former reference signal should be received even by a user equipment that does not receive downlink data for a specific subframe. Also, this reference signal for acquisition of channel information may be used even in case of handover status. The latter reference signal is transmitted from the base station together with a corresponding resource when the base station transmits downlink data. In this case, the user equipment may perform channel measurement by receiving the corresponding reference signal, whereby the user equipment may demodulate the data. This reference signal for data demodulation should be transmitted to a region to which data are transmitted.

Carrier Aggregation

Figure 6:
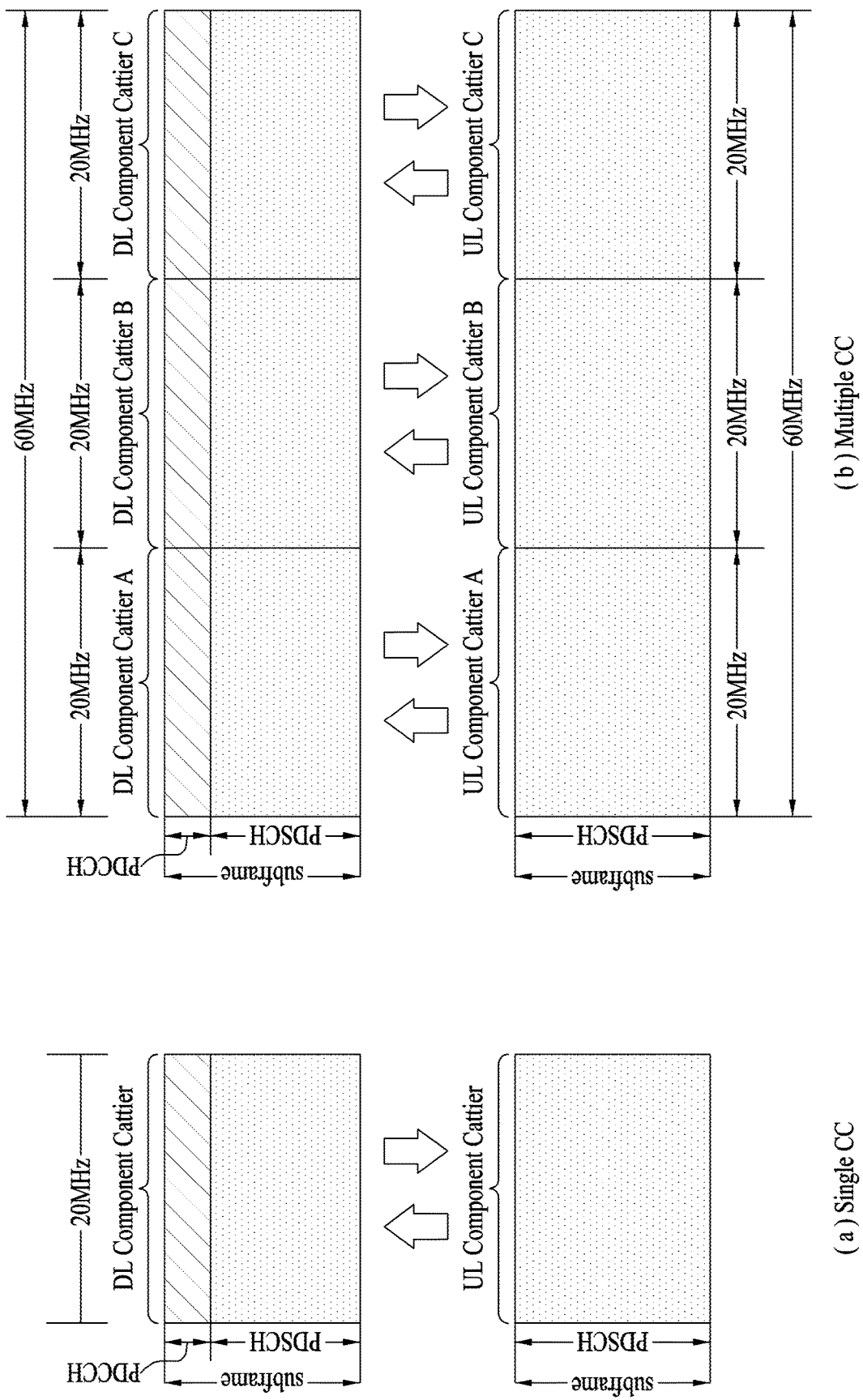
FIG. 6 and FIG. 7 are diagrams to describe carrier aggregation.

FIG. 6 is a diagram to describe carrier aggregation. Prior to describing carrier aggregation, the concept of a cell introduced to manage and control a radio resource in LTE-A is described as follows. First of all, a cell can be understood as combination of a DL resource and a UL resource. In this case, the UL resource is not an essential element. Hence, a cell can be configured with a DL resource only or both a DL resource and a UL resource. This is the current definition by LTE-A Release 10. On the contrary, a cell can be configured with a UL resource only. A DL resource can be named a DL component carrier (DL CC) and a UL resource can be named a UL component carrier (UL CC). DL CC and UL CC can be represented as carrier frequency. And, the carrier frequency means a center frequency in a corresponding cell.

Cells can be classified into a primary cell (PCell) operating on a primary frequency and a secondary cell (SCell)

operating on a secondary frequency. PCell and SCell can be commonly named a serving cell. A cell, which is indicated when a user equipment performs an initial connection establishment process, a connection re-establishment process or a handover process, can become the PCell. In particular, the PCell can be understood as a cell that becomes a control related center in a carrier aggregation environment that will be described later. A user equipment can receive assignment of PUCCH in its PCell and is then able to transmit the PUCCH. The SCell can be configured after completion of RRC (radio resource control) connection establishment and may be used to provide an additional radio resource. In the carrier aggregation environment, a serving cell except PCell may be regarded as SCell. If carrier aggregation is not configured for a user equipment in RRC_CONNECTED state or a user equipment in RRC_CONNECTED state does not support carrier aggregation, there exists a single serving cell configured with PCell only. On the other hand, if carrier aggregation is configured for a user equipment in RRC_CONNECTED state, at least one or more serving cells exist. And, PCell and all SCells are included in the entire serving cells. For a user equipment supportive of carrier aggregation, a network can configure at least one SCell in addition to PCell initially configured in the connection establishment process after initiation of an initial security activation process.

In the following description, carrier aggregation is explained with reference to FIG. 6. First of all, carrier aggregation is the technology introduced to enable a wider band to be used in order to meet the demand for a high and fast transmission rate. Carrier aggregation may be defined as an aggregation of at least two component carriers (CCs) differing from each other in carrier frequency. Referring to FIG. 6, FIG. 6(a) shows a subframe in case that a single CC is used in a legacy LTE system and FIG. 6(b) shows a subframe in case of using carrier aggregation. FIG. 6(b) shows one example that 3 CCs on 20 MHz are used to support a bandwidth of total 60 MHz. In this case, the CCs may be contiguous or non-contiguous.

A user equipment can simultaneously receive and monitor DL data through a plurality of DL CCs. A linkage between each DL CC and UL CC can be indicated by system information. DL CC/UL CC link may be fixed to a system or configured semi-statically. Moreover, even if a whole system band is configured with N CCs, a frequency band which can be monitored/received by a specific user equipment may be limited to M (<N) CCs. Various parameters for carrier aggregation may be set by a cell-specific, UE group-specific or UE-specific method.

Figure 7:
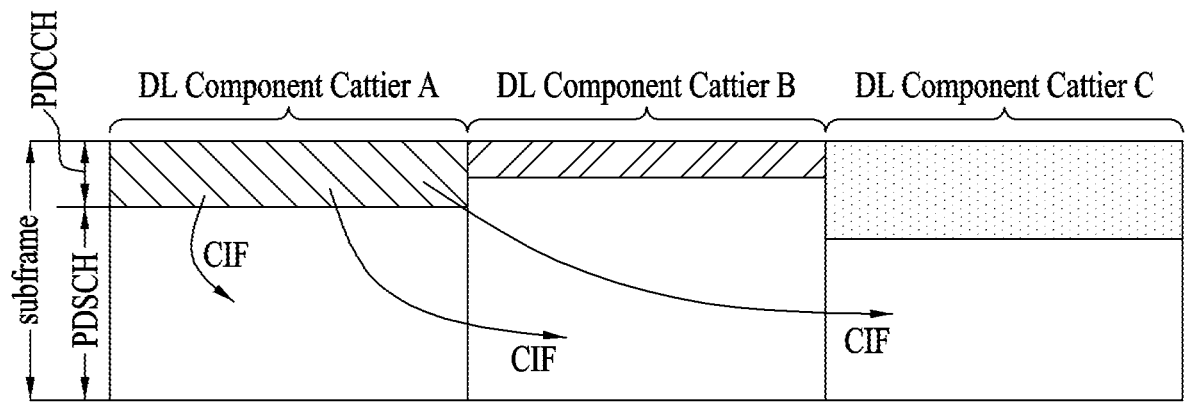

FIG. 7 is a diagram to describe cross carrier scheduling. First of all, cross carrier scheduling means that a control region of DL CC of one of a plurality of serving cells includes all DL scheduling assignment information of another DL CC or that a control region of DL CC of one of a plurality of serving cells includes all UL scheduling grant information on a plurality of DL CCs linked to the corresponding DL CC.

A carrier indicator field (CIF) is described as follows.

First of all, as mentioned in the foregoing description, CIF may or may not be included in a DCI format transmitted on PDCCH. If the CIF is included therein, it indicates that cross carrier scheduling is applied. In case that cross carrier scheduling is not applied, DL scheduling assignment information is valid on DL CC on which current DL scheduling assignment information is carried. Moreover, a UL scheduling grant is valid for one UL CC linked to DL CC on which DL scheduling assignment information is carried.

If cross carrier scheduling is applied, it indicates a CC related to DL scheduling assignment information carried on PDCCH in a prescribed DL CC. For instance, referring to FIG. 9, DL assignment information on DL CC B and DL CC C, i.e., information on PDSCH resource is transmitted through PDCCH in a control region on DL CC A. A user equipment can recognize a resource region of PDSCH and a corresponding CC through CIF by monitoring the DL CC A.

Whether CIF is included in PDCCH or not can be set semi-static and can be enabled UE-specifically by upper layer signaling. If the CIF is disabled, PDCCH on a specific DL CC allocates a PDSCH resource on the same DL CC and is able to allocate PUSCH resource on UL CC linked to the specific DL CC. In this case, the same coding scheme, CCE based resource mapping and DCI format of an existing PDCCH structure are applicable thereto.

On the contrary, if the CIF is enabled, PDCCH on a specific DL CC can allocate PDSCH/PUSCH resource on a single DL/UL CC indicated by the CIF among a plurality of aggregated CCs. In this case, the CIF can be additionally defined in an existing PDCCH DCI format. For instance, the CIF may be defined as a field having a fixed 3-bit length or a CIF location may be fixed irrespective of a DCI format size. In this case, the same coding scheme, CCE based resource mapping and DCI format of an existing PDCCH structure are applicable thereto.

Figure 9:
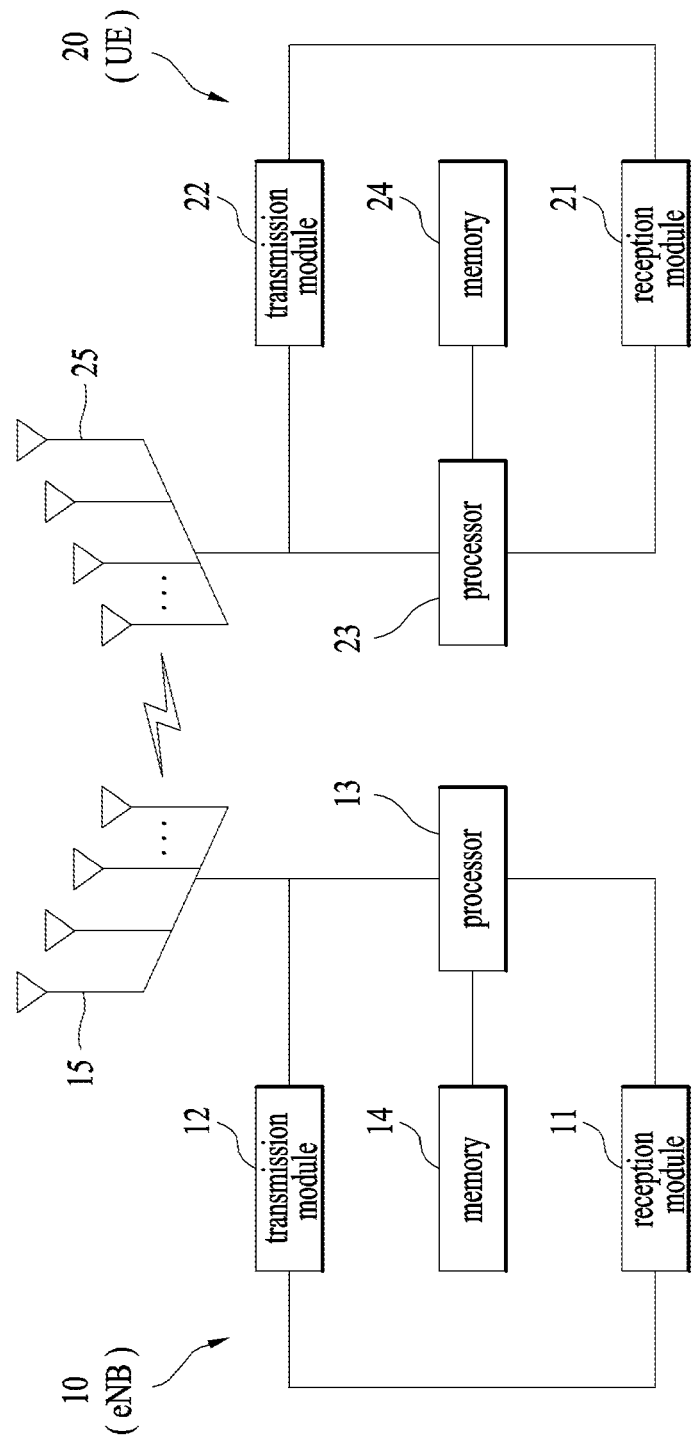
FIG. 9 is a diagram to illustrate configuration of a transceiver device.

Although CIF exists, a base station is able to assign DL CC set to monitor PDCCH. Hence, it is able to reduce the burden put on blind decoding of a user equipment. A PDCCH monitoring CC set may include a prescribed portion of all aggregated DL CCs and the user equipment can perform detection/decoding of PDCCH on the corresponding CC set only. In particular, in order to schedule PDSCH/PUSCH for the user equipment, the base station can transmit PDCCH on the PDCCH monitoring CC set only. In this case, a PDCCH monitoring DL CC set may be configured UE-specific, UE group-specific or cell-specific. For instance, in case that 3 DL CCs are aggregated, as shown in FIG. 9, DL CC A can be set as the PDCCH monitoring DL CC. If the CIF is disabled, PDCCH on each DL CC can schedule PDSCH on DL CC A only. On the other hand, if the CIF is enabled, the PDCCH on the DL CC A is able to schedule PDSCH on another DL CC as well. In case that the DL CC A is set as the PDCCH monitoring CC, PDSCCH is not transmitted on DL CC B and DL CC C.

In a system to which the above-described carrier aggregation is applied, a user equipment is able to receive a plurality of PDSCHs through a plurality of DL carriers. In doing so, it may happen that the user equipment should transmit ACL/NACK for each data on a single UL CC in a single subframe. In case of transmitting a plurality of ACKs/NACKs in a single subframe using PUCCH format 1a/1b, a high transmission power is required, PAPR of a UL transmission increases, and a transmittable distance from a base station of the user equipment may decrease due to an inefficient use of a transmission power amplifier. In order to transmit a plurality of ACKs/NACKs on a single PUCCH, ACK/NACK bundling or ACK/NACK multiplexing may be applicable thereto.

On the other hand, it may happen that ACK/NACK information on numerous DL data according to application of carrier aggregation and/or ACK/NACK information on numerous DL data transmitted in a plurality of DL subframes in TDD system should be transmitted on PUCCH in a single subframe. In doing so, if ACK/NACK bits to be transmitted are more than the number supportable through the ACK/NACK bundling or the ACK/NACK multiplexing, it is unable to transmit the ACK/NACK information correctly by the above-described methods.

Although such a carrier sensing based communication system as WiFi is used on an unlicensed band (U-band) generally, such a communication scheme used on a licensed band (L-band) as LTE can be used on U-band as well. In this case, L-band technology for protecting the existing U-band technologies of communication systems such as WiFi, Bluetooth and the like should apply. Moreover, on U-band, unlike the existing L-band, several different operators may probably operate on U-band. In doing so, the problem of coexistence between the different operators should be solved.

Figure 8:
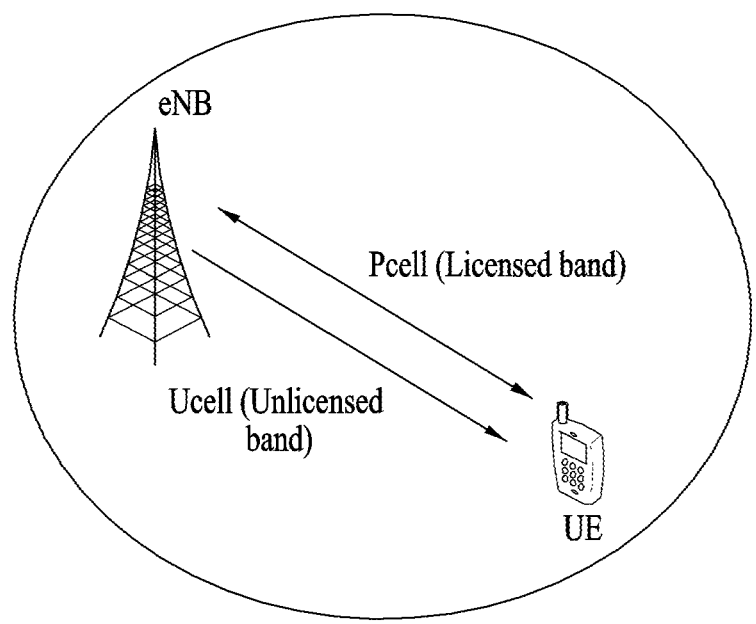
FIG. 8 is a diagram to describe signal transmission/reception on an unlicensed band according to an embodiment of the present invention.

A cellular communication scheme on U-band may operate as a carrier aggregation scheme between L-band and U-band, or may operate as U-band standalone. For clarity of the following description, as shown in FIG. 8, assume a situation that a UE performs wireless communication through two component carriers (CC) on each of L-band and U-band. Herein, a carrier of L-band may be called a primary component carrier (PCC or PCell), and a carrier of U-band may be called a secondary component carrier (SCC, SCell or Ucell (unlicensed band CC or cell)), by which the present invention is non-limited. And, the following descriptions are applicable to a situation that a multitude of L-bands and a multitude of U-bands are used for a carrier aggregation scheme.

On U-band, a base station may perform carrier sensing (CS) before transceiving data. The base station checks whether a current channel state of SCell is busy or idle. If determining that the current channel state is idle, the base station may send a scheduling grant through (E)PDCCH of PCell (in case of applying cross carrier aggregation) or PDCCH of SCell and then attempt to transceive data. In doing so, it is able to set TxOP (transmission opportunity) (or, reserved resource period (RRP)) interval configured with M contiguous subframes. Herein, the base station may inform a UE of a value of M and the usage of M subframes by higher layer signaling (via PCell) or through physical control/data channel.

In the above-mentioned signal transceiving on U-band, it may happen that different operators use the same physical cell ID. In case of L-band, since frequency assignment is performed on each operator, there is no problem. Yet, in case of U-band, several operators may use the same physical cell ID in the same/similar area due to its characteristics. Hence, various embodiments for solving such a problem are described as follows.

Embodiment 1

On U-band, a user equipment according to an embodiment of the present invention may receive a reference signal generated from a scrambling sequence having an initial value changed every 10 subframes and also receive a DL (downlink) signal based on the reference signal, from a base station. Herein, a seed value of a change pattern of an initial value (i.e., a hoping pattern of an initial value) may be determined according to an operator of the base station sending the DL signal on the U-band. The initial value of the scrambling sequence may be changed despite that the user equipment fails to make a handover.

Each time a cell ID of a base station is changed every 10 subframes according to a change pattern. Particularly, a scrambling sequence of a reference signal sequence can be initialized by a formula including a slot number $n_s$, an OFDM symbol number l, $N_{CP}$ (e.g., 1 at normal CP, 1 at extended CP), and a cell ID $N^{cell}_{ID}$. Hence, if a cell ID is changed according to a specific hopping pattern, an initial value of a scrambling sequence used to generate a reference signal is changed according to the specific hopping pattern.

Herein, although the cell ID is hopped, a seed value of a hopping pattern (function) of the initial value is determined according to an operator. Namely, if operators are different, they have different hopping patterns due to different seed values. Although Ucell of a specific operator collides with a cell ID of a different operator at a specific timing, since Ucells can use different cell IDs according to operator-specific hopping patterns after expiration of a predetermined time, it is able to prevent cell IDs from colliding with each other between operators consistently. The seed value of the change pattern may be received through one of physical layer signaling of the primary cell and higher layer signaling. If a UE needs to detect cell IDs of different operators (e.g., in case of measuring a signal of a different operator and then utilizing it for ICIC and the like), a seed value used for cell ID hopping of a different operator may be also signaled by physical or higher layer signaling through PCell.

In the above example, a cell ID is assumed as changed every 10 subframes, in which a different time unit may be used. Namely, in the above example, a change of SFN (system frame number) is a time unit for performing hopping (i.e., a time unit for changing cell ID), but may include an RRP unit or a unit of k subframes. Yet, although Ucell may become a reference for a time unit for changing a cell ID, Pcell may become a reference as well. Namely, if a cell ID changed time unit is a subframe, the subframe may correspond to a subframe of a primary cell.

Since cell ID is changed each 10 subframes, a synchronization signal transmitted on U-band is changed each 10 subframes as well.

In the above disclosure, the reference signal may include a DL reference signal except an EPDCCH (enhanced physical downlink control channel) related to DMRS (demodulation reference signal) and an MBSFN (multicast broadcast single frequency network) reference signal. Namely, PSS/SSS, CRS/CSI-RS/DMRS/PRS, scrambling and the like can be transmitted based on cell ID) determined for Ucell.

Embodiment 2

According to a second embodiment, information for identifying an operator is included in a specific signal. Particularly, PLMN ID (or, PLMN ID hashed ID, bit sequence for identifying an operator, etc.) can be included in PBCH, SIB, or the like. Herein, at least one of PBCH and SIB can be transmitted on Ucell.

Having received such a signal, a UE can check whether it is a cell of its own by decoding PBCH, SIB or the like.

Embodiment 3

A UE can identify an operator through SFN (system frame number). Particularly, a UE aware of SFN of Pcell checks SFN of Ucell. If an error range with Pcell is equal to or smaller than a preset range, the UE can regard it as its own cell. The reason for this is that it is difficult to match synchronization by SFN units despite that Ucell is accidently synchronized with an adjacent cell by PSS units.

For the specific implementation of Embodiment 3, an SFN error rage between Pcell and Ucell is predetermined or an SFN error range may be signaled to a UE through higher or physical layer signal of Pcell. Although several cells seem to have the same cell ID, the UE detects SFN of PBCH and then determines only Ucell within a predetermined error with its own Pcell as its own cell.

Embodiment 4

A range of physical cell ID available for operators can be specified in advance. Namely, operators, which deploy LTE-U cell in a specific area, divide physical cell ID to use on U-band. Particularly, a set of cell IDs used on Ucell by a specific operator may be predetermined through inter-operator pre-agreement. To this end, a cell ID set used on Ucell can be pre-signaled through a physical or higher layer signal of Pcell. Or, as such information is embedded in a UE in advance, the UE can be aware of cell ID used on Ucell by an operator of the UE in advance.

Particularly, for first example, an operator A may use a cell ID set A, and an operator B may use a cell ID set B. Namely, a cell ID to be used per operator is predetermined in advance.

For second example, PSS sequence is differently used per operator. When there are three sequences of PSS [PSS1, PSS2, PSS3], an operator A uses a cell ID of PSS 1, an operator B uses a cell ID of PSS 2, and an operator C uses a cell ID of PSS 3.

For third example, by a value resulting from PCID modulo M (e.g., number of operators), cell IDs can be grouped. If M is not a multiple of 3, PCID is mixed per operator. If M is 3, it results in the method like the second example. Namely, when M is 3, a specific operator uses specific a PSS only. Thus, if a specific operator uses a specific PSS only, since the operator uses the same PSS all on Ucell, it causes an effect that it becomes SFN. Hence, it may be difficult to estimate a precise timing. To solve such a problem, PCID can be grouped in a manner that several PSSs can be used per operator.

For fourth example, SSS sequences are grouped with a value resulting from 167 SSS sequence IDs modulo M (e.g., the number of operators). In this case, cell IDs can be grouped using PCID generated from combining the grouped SSS with 3 PSSs. If so, unlike the second or third example, it is able to prevent a specific cell ID group from using a specific PSS. The PCID grouping method may be predetermined. Or, PCID grouping information or parameters used for PCID grouping may be signaled through Pcell to a UE using a physical or higher layer signal.

Embodiment 5

By sensing of a base station or UE, a cell ID can be determined dynamically.

Embodiment 5-1

A base station can search for a cell ID around for a preset time or by preset periods. Information on period and offset for a Ucell base station to search for ID of another cell may be instructed to the Ucell base station through Pcell as a backhaul signal. If cell on/off is used for energy saving, interference control and the like, when a cell is turned on, a base station can perform a process for searching surrounding cells. In doing so, such a cell search time information of the base station may be signaled to a UE of Ucell. The reason for this is described as follows. First of all, while a base station of Ucell keeps searching, data transmission may be impossible. So, a UE recognizes it in advance and can be then prevented from doing a wrong operation. In doing so, when a received signal power or quality (e.g., RSRP or RSRQ) of PSS/SSS, CRS or CSI-RS of a surrounding cell exceeds a predetermined threshold, a corresponding cell ID may be excluded from cell ID selection of Ucell.

Embodiment 5-2

A UE searches surroundings of Ucell for a cell ID. In doing so, the UE may report a list of cell ID having RSRP or RSRQ of PSS/SSS, CRS or CSI-RS, which exceeds a predetermined threshold, or a cell ID list and a reception quality value (a received RSRP or RSRQ value) to Pcell or Ucell by physical or higher layer signaling. A base station may select a cell ID to use by considering the cell ID and/or the cell ID received signal quality value reported from the UE.

After Ucell has been deployed or a cell has been turned on, if a cell ID is not changed, all cell ID determining operations should occur before signal transmission of Ucell. Hence, a UE or base station searches an ambient situation (e.g., searches for a cell ID and sets a cell ID unused around surroundings) before transmitting a signal, sets a cell ID, and then send PSS/SSS or the like. Yet, in case of dynamically or semi-statically changing a cell ID, a base station of Ucell sends a signal with a predetermined cell ID once. If discovering another cell ID around by the sensing of the UE or base station, the corresponding base station may change the cell ID into the discovered cell ID. In doing so, a cell ID temporarily used is named a temporary cell ID (hereinafter abbreviated T-cell ID). If the T-cell ID is changed, a signal indicating such a change is signaled to the UE through a physical or higher layer signal of Pcell or Ucell to the UE, thereby enabling the UE to recognize that the cell ID is changed in advance. When the T-cell ID is changed, at least one of i) an indicator indicating a presence or non-presence of T-cell ID change, ii) a cell ID to be changed next, iii) a time for maintaining a current T-cell ID (SF or radio frame duration), iv) a T-cell ID changed timing (SFN number and/or subframe number), and v) a hopping seed value and period in case of hopping T-cell ID can be signaled to the UE.

Embodiment 6

The number of cell IDs for U-band (unlicensed band) can be incremented greater than that for L-band (licensed band).

For instance, 504*a cell IDs can be used, where 'a' is a natural number. Herein, 'a' may correspond to the number of operators participating in LTE-U in a specific area. If the operator number is 'a', it is able to generate (9 +N)-bit cell ID by adding N=ceil (log2(a)) bits. This manner is advantageous in that each operator can use all physical cell IDs.

In doing so, as a method of distinguishing a cell ID in a physical layer signal, the following method is usable.

The most significant problem between different operators is a case that information of a different cell starts to be read in an initial access. To prevent this, a synchronization signal sequence generating method may be newly defined in Ucell. For instance, such a narrow bandwidth as 6 RB may not be supported in Ucell. If so, PSS/SSS carried not on the existing 6 RB but on greater RB can be newly defined. When an existing PSS/SSS generating method is reused as far as possible, a sequence length can be defined simply and newly in LTE Ucell. For instance, a narrow bandwidth having a length greater than 62 of an existing PSS/SSS length may be used.

As another method, in case of reusing the existing PSS/SSS intact, an additional sequence is transmitted or a physical layer signal capable of indicating N (=ceil (log2(a))) bits may be transmitted in addition. In doing so, if a base station performs carrier sensing in Ucell and then sends a reserved signal, it is able to configure a preamble of the reserved signal interlinked to the added cell ID N bits.

As further method, two or more PSS/SSS can be sent in a single frame. With two PSS/SSS combinations,504*504 cell ID generations are possible. In this case, like the case of Embodiment 5, cell IDs can be grouped per operator.

In case that cell IDs are increased as well as PSS/SSS, an initial parameter setting method used for an existing scrambling sequence and an RS sequence should be changed. Although an existing cell ID assumes a length within 9 bits (504<512), if a cell ID length becomes (9+N) bits, a sequence initializing method can be changed as shown in Table 3. In this case, if MBSFN ID identifies an operator, an RS sequence can be also generated to fit a cell ID having a length of (9+N). If a field for identifying an operator is also added in case of RNTI or SCID, an RS sequence generation may be changed by a similar method.

Meanwhile, in a manner different from the aforementioned manner, the N value may be reflected not by an existing cell ID region but by a highest position (MSB) of a shifter register. For instance, in the seed value setting method B, a cell ID value (N) added to a highest position may be reflected.

11, a transmitting device 12, a processor 13, a memory 14 and a plurality of antennas 15. A plurality of the antennas 15 may mean a transmitting point device supportive of MIMO transmission and reception. The receiving device 11 can receive various signals, data and information in uplink from a user equipment. The transmitting device 12 can transmit various signals, data and information in downlink to the user equipment. And, the processor 13 can control overall operations of the transmitting point device 10.

The processor 13 of the transmitting point device 10 according to one embodiment of the present invention can

TABLE 3

| | |
|---|---|
| Existing RS, in generating a scrambling sequence, a seed value setting method | scrambling sequence: $c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}$ <br> RS sequence <br> CRS: $c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$ <br> MBSFN: $c_{init} = 2^9 \cdot (7 \cdot (n_s + 1) + l + 1) \cdot (2 \cdot N_{ID}^{MBSFN} + 1) + N_{ID}^{MBSFN}$ <br> DMRS: $c_{init} = (\lfloor n_s/2 \rfloor + 1) \cdot (2N_{ID}^{cell} + 1) \cdot 2^{16} + n_{RNTI}$ for port 5 <br> $c_{init} = (\lfloor n_s/2 \rfloor + 1) \cdot (2n_{ID}^{(nSCID)} + 1) \cdot 2^{16} + n_{SCID}$ for port 7~14 <br> PRS: $c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$ <br> CSI-RS: $c_{init} = 2^{10} \cdot (7 \cdot (n_s + 1) + l + 1) \cdot (2 \cdot N_{ID}^{CSI} + 1) + 2 \cdot N_{ID}^{CSI} + N_{CP}$ |
| RS in LTE Ucell, in generating a scrambling sequence, a seed value generating method A | scrambling sequence: $c_{init} = \begin{cases} n_{RNTI} \cdot 2^{14+N} + q \cdot 2^{13+N} + \lfloor n_s/2 \rfloor \cdot 2^{9+N} + N_{ID}^{cell} & \text{for PDSCH} \\ \lfloor n_s/2 \rfloor \cdot 2^{9+N} + N_{ID}^{MBSFN} & \text{for PMCH} \end{cases}$ <br> RS sequence <br> CRS: $c_{init} = 2^{10+N} \cdot (7 \cdot (n_s + 1) + l + 1) \cdot (2 \cdot N_{ID}^{cell} + 1) + 2 \cdot N_{ID}^{cell} + N_{CP}$ <br> MBSFN: $c_{init} = 2^{9+N} \cdot (7 \cdot (n_s + 1) + l + 1) \cdot (2 \cdot N_{ID}^{MBSFN} + 1) + N_{ID}^{MBSFN}$ <br> DMRS: $c_{init} = (\lfloor n_s/2 \rfloor + 1) \cdot (2N_{ID}^{cell} + 1) \cdot 2^{16+N} + n_{RNTI}$ for port 5 <br> $c_{init} = (\lfloor n_s/2 \rfloor + 1) \cdot (2n_{ID}^{(nSCID)} + 1) \cdot 2^{16+N} + n_{SCID}$ for port 7~14 <br> PRS: $c_{init} = 2^{10+N} \cdot (7 \cdot (n_s + 1) + l + 1) \cdot (2 \cdot N_{ID}^{cell} + 1) + 2 \cdot N_{ID}^{cell} + N_{CP}$ <br> CSI-RS: $c_{init} = 2^{10+N} \cdot (7 \cdot (n_s + 1) + l + 1) \cdot (2 \cdot N_{ID}^{CSI} + 1) + 2 \cdot N_{ID}^{CSI} + N_{CP}$ |
| RS in LTE Ucell, in generating a scrambling sequence, a seed value generating method B | scrambling sequence: $c_{init} = \begin{cases} n_a \cdot 2^{x1} + n_{RNTI} \cdot 2^{14} + q \cdot 2^{13} + \lfloor n_s/2 \rfloor \cdot 2^9 + N_{ID}^{cell} & \text{for PDSCH} \\ n_a \cdot 2^{x2} + \lfloor n_s/2 \rfloor \cdot 2^9 + N_{ID}^{MBSFN} & \text{for PMCH} \end{cases}$ <br> RS sequence <br> CRS: $c_{init} = n_a \cdot 2^{x3} + 2^{10} \cdot (7 \cdot (n_s + 1) + l + 1) \cdot (2 \cdot N_{ID}^{cell} + 1) + 2 \cdot N_{ID}^{cell} + N_{CP}$ <br> MBSFN: $c_{init} = n_a \cdot 2^{x4} + 2^9 \cdot (7 \cdot (n_s + 1) + l + 1) \cdot (2 \cdot N_{ID}^{MBSFN} + 1) + N_{ID}^{MBSFN}$ <br> DMRS: $c_{init} = n_a \cdot 2^{x5} + (\lfloor n_s/2 \rfloor + 1) \cdot (2N_{ID}^{cell} + 1) \cdot 2^{16} + n_{RNTI}$ for port 5 <br> $c_{init} = n_a \cdot 2^{x6} + (\lfloor n_s/2 \rfloor + 1) \cdot (2n_{ID}^{(nSCID)} + 1) \cdot 2^{16} + n_{SCID}$ for port 7~14 <br> PRS: $c_{init} = n_a \cdot 2^{x7} + 2^{10} \cdot (7 \cdot (n_s + 1) + l + 1) \cdot (2 \cdot N_{ID}^{cell} + 1) + 2 \cdot N_{ID}^{cell} + N_{CP}$ <br> CSI-RS: $c_{init} = n_a \cdot 2^{x8} + 2^{10} \cdot (7 \cdot (n_s + 1) + l + 1) \cdot (2 \cdot N_{ID}^{CSI} + 1) + 2 \cdot N_{ID}^{CSI} + N_{CP}$ <br> Herein, $n_a$ is a value when N is converted into a decimal number and x1~x8 become the maximum figures used for the existing sequence initialization. Ex., in case of a PDSCH scrambling sequence, when $n_{RNTI}$ is converted into a binary number, if a length is 16, x1 becomes 30. |

Since examples of the aforementioned proposed schemes can be included as one of the implementations methods of the present invention, they can be regarded as a sort of proposed schemes. Moreover, although the aforementioned proposed schemes may be implemented independently, they may be implemented in a manner of combining (or merging) some of the proposed schemes. Information indicating a presence or non-presence of applicability of the proposed methods (or, information on rules of the proposed methods) can be defined to be notified to a user equipment by a base station through predefined signaling (e.g., physical layer signaling, higher layer signaling, etc.).

Device Configuration According to Embodiment of Present Invention

FIG. 9 is a diagram for a configuration of a transmitting point device and a user equipment device according to one embodiment of the present invention.

Referring to FIG. 9, a transmitting point device 10 according to the present invention may include a receiving device process or handle the items required for the respective embodiments mentioned in the foregoing description.

The processor 13 of the transmitting point device 10 performs functions of operating and processing information received by the transmitting point device 10, information to be transmitted by the transmitting point device 10, and the like. The memory 14 can store the operated and processed information and the like for a prescribed period and can be substituted with such a component as a buffer (not shown in the drawing) and the like.

Referring still to FIG. 9, a user equipment device 20 according to the present invention may include a receiving device 21, a transmitting device 22, a processor 23, a memory 24 and a plurality of antennas 25. A plurality of the antennas 25 may mean a user equipment device supportive of MIMO transmission and reception. The receiving device 21 can receive various signals, data and information in downlink from a transmitting point. The transmitting device 22 can transmit various signals, data and information in uplink to the transmitting point. And, the processor 23 can control overall operations of the user equipment device 20.

The processor 23 of the user equipment device 20 according to one embodiment of the present invention can process or handle the items required for the respective embodiments mentioned in the foregoing description.

The processor 23 of the user equipment device 20 performs functions of operating and processing information received by the user equipment device 20, information to be transmitted by the user equipment device 20, and the like. The memory 24 can store the operated and processed information and the like for a prescribed period and can be substituted with such a component as a buffer (not shown in the drawing) and the like.

In the above-mentioned detailed configurations of the transmitting point device and the user equipment device, the contents or items explained in the descriptions of the various embodiments of the present invention may be independently applicable or at least two embodiments of the present invention may be simultaneously applicable. And, redundant descriptions shall be omitted from the following description for clarity.

The description of the transmitting point device 10 with reference to FIG. 9 may be identically applicable to a relay node device as a DL transmitting entity or a UL receiving entity. And, the description of the user equipment device 20 with reference to FIG. 9 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method of receiving a signal on an unlicensed band in a user equipment of a wireless communication system operated by an operator using both a licensed band and the unlicensed band, the method comprising:
   obtaining a first system frame number (SFN) of a primary cell using the licensed band;
   obtaining a second SFN of a secondary cell using the unlicensed band;
   obtaining a seed value used by the operator for hopping of a cell identifier (ID) based on a difference between the first SFN and the second SFN being equal to or less than a threshold, wherein the seed value is different from each of a plurality of seed values used by other operators, and wherein the seed value and the plurality of seed values are determined respectively based on the operator and the other operators;
   receiving, on the unlicensed band, a reference signal generated from a scrambling sequence having an initial value, wherein the initial value is changed in every 10 subframes based on the hopping of the cell ID, and wherein the hopping of the cell ID is performed based on a hopping function determined based on the seed value and the first SFN of the primary cell; and
   receiving, on the unlicensed band, a downlink signal based on the reference signal.

2. The method of claim 1, wherein the initial value of the scrambling sequence is changed although the user equipment does not perform a handover.

3. The method of claim 1, wherein a synchronization signal transmitted on the unlicensed band is changed in the every 10 subframes.

4. The method of claim 1, wherein the initial value is changed by counting subframes of the primary cell.

5. The method of claim 1, wherein the seed value is obtained either through physical layer signaling of the primary cell or through higher layer signaling of the primary cell.

6. The method of claim 1, wherein the reference signal comprises a downlink reference signal except an enhanced physical downlink control channel (EPDCCH) related to a demodulation reference signal (DMRS) and a multicast broadcast single frequency network (MBSFN) reference signal.

7. The method of claim 1, wherein the cell ID is changed according to the hopping function in the every 10 subframes.

8. A user equipment for receiving a signal on an unlicensed band in a wireless communication system operated by an operator using both a licensed band and the unlicensed band, the user equipment comprising:
- a transmitting device;
- a receiving device; and
- a processor configured to:
  - obtain a first system frame number (SFN) of a primary using the licensed band,
  - obtain a second SFN of a secondary cell using the unlicensed band, detect, through the primary cell, a plurality of seed values used by other operators,
  - obtain a seed value which is used by the operator for hopping of a cell identifier (ID) based on a difference between the first SFN and the second SFN being equal to or less than a threshold, wherein the seed value is different from each of a plurality of seed values used by other operators, and wherein the seed value and the plurality of seed values are determined respectively based on the operator and the other operators,
  - receive, on the unlicensed band, a reference signal generated from a scrambling sequence having an initial value, wherein the initial value is changed in every 10 subframes based on the hopping of the cell ID, and wherein the hopping of the cell ID is performed based on a hopping function determined based on the seed value and the first SFN of the primary cell, and
  - receive, on the unlicensed band, a downlink signal based on the reference signal, wherein the initial value is changed based on the hopping of the cell ID.

9. The user equipment of claim 8, wherein the initial value of the scrambling sequence is changed although the user equipment does not perform a handover.

10. The user equipment of claim 8, wherein a synchronization signal transmitted on the unlicensed band is changed in the every 10 subframes.

11. The user equipment of claim 8, wherein the initial value is changed by counting subframes of the primary cell.

12. The user equipment of claim 8, wherein the seed value is obtained either through physical layer signaling of the primary cell or through higher layer signaling of the primary cell.

13. The user equipment of claim 8, wherein the reference signal comprises a downlink reference signal except an enhanced physical downlink control channel (EPDCCH) related to a demodulation reference signal (DMRS) and a multicast broadcast single frequency network (MBSFN) reference signal.

14. The user equipment of claim 8, wherein the cell ID is changed according to the hopping function in the every 10 subframes.

* * * * *